United States Patent [19]

Budzich

[11] 3,984,979

[45] Oct. 12, 1976

[54] LOAD RESPONSIVE FLUID CONTROL VALVES

[76] Inventor: Tadeusz Budzich, 80 Murwood Drive, Moreland Hills, Ohio 44022

[22] Filed: Mar. 19, 1975

[21] Appl. No.: 559,818

Related U.S. Application Data

[63] Continuation-in-part of Ser. No. 377,044, July 7, 1973, Pat. No. 3,882,896.

[52] U.S. Cl. .................................... 60/445; 91/446; 91/462; 137/596; 137/625.12

[51] Int. Cl.² .......................................... F16H 39/46

[58] Field of Search ............. 60/420, 427, 445, 489; 91/444, 446, 449, 451, 462; 137/596, 596.12, 625.12

[56] References Cited

UNITED STATES PATENTS

| | | | |
|---|---|---|---|
| 3,285,282 | 11/1966 | Martin | 137/504 X |
| 3,455,210 | 7/1969 | Allen | 91/446 |
| 3,470,694 | 10/1969 | Budzich | 60/427 |
| 3,488,953 | 1/1970 | Haussler | 60/462 |
| 3,730,219 | 5/1973 | Tennis | 137/596 |
| 3,744,517 | 7/1973 | Budzich | 137/596.2 |
| 3,807,443 | 4/1974 | Jacobs | 137/501 |
| 3,807,447 | 4/1974 | Masuda | 137/596.13 |
| 3,858,393 | 1/1975 | Budzich | 60/427 |

*Primary Examiner*—Edgar W. Geoghegan
*Attorney, Agent, or Firm*—William N. Hogg

[57] ABSTRACT

A load responsive direction and flow control valve for use in fluid power load responsive system. The valve maintains a selected constant flow level for control of both positive and negative loads, irrespective of the change in the load magnitude or change in the fluid pressure, supplied to the valve. When controlling positive or negative loads the valve maintains a constant pressure differential across a flow control metering orifice utilizing a single control slide member, first by throttling fluid entering the inlet chamber and then by throttling the fluid leaving the outlet chamber. The valve may be used with fixed displacement pumps, fixed displacement pumps equipped with differential pressure relief valves, with variable displacement pumps equipped with pressure compensators and variable displacement pumps equipped with differential pressure compensators.

36 Claims, 4 Drawing Figures

F/G. 3

LOAD RESPONSIVE FLUID CONTROL VALVES

This is a continuation-in-part of application Ser. No. 377,044, filed July 7, 1973, now U.S. Pat. No. 3,882,896, granted May 13, 1975.

BACKGROUND OF THE INVENTION

This invention relates generally to load responsive fluid control valves and to fluid power systems incorporating such valves which systems are supplied by a single fixed or variable displacement pump. Such control valves are equipped with an automatic load responsive control, and can be used in a multiple load system in which a plurality of loads are individually controlled under positive and negative load conditions by separate control valves.

In more particular aspects this invention relates to direction and flow control valves capable of controlling simultaneously a number of loads under both positive and negative conditions.

Closed center load responsive fluid control valves are very desirable for a number of reasons. They permit load control with reduced power losses, and therefore increased system efficiency; and when controlling one load at a time they provide a feature of flow control, irrespective of the variation in the magnitude of the load. Normally such valves include a load responsive control which automatically maintains the pump discharge pressure at a level higher, by a constant pressure differential, than the pressure required to sustain the load. A variable orifice, introduced between pump and load, varies the flow supplied to the load, each orifice area corresponding to a different flow level, which is maintained constant, irrespective of variation in the magnitude of the load. The application of such a system is, however limited by several basic system disadvantages.

Since in this system the variable control orifice is located between the pump and the load, the control signal to a pressure regulating throttling device is at a high pressure level, inducing high forces in the control mechanism. Another disadvantage of such a control is that it regulates the flow of fluid into the motor and therefore does not compensate for fluid compressibility and leakage across both motor and valve. A fluid control valve for such a system is shown in U.S. Pat. No. 3,488,953 issued to Hausler.

The valve control can maintain a constant pressure differential and therefore constant flow characteristics when operating only one load at a time. With two or more loads, simultaneously controlled, only the highest of the loads will retain the flow control characteristics, the speed of actuation of the lower loads varying with the change in magnitude of the highest load. This drawback can be overcome in part by the provision of a proportional valve as disclosed in my U.S. Pat. No. 3,470,694, dated Oct. 7, 1969 and also in U.S. Pat. No. 3,455,210 issued to Allen on July 15, 1969. However, while these valves are effective in controlling positive loads they do not retain flow control characteristics when controlling negative loads, which instead of taking, supply the energy to the fluid system, and hence the speed of actuation of such a load in a negative load system will vary with the magnitude of the negative load. Especially with so-called overcenter loads, where a positive load may become a negative load, such a valve will lose its speed control characteristics in the negative mode.

This drawback can be overcome by provision of a load responsive fluid control valve as disclosed in my U.S. Pat. Nos. 3,744,517 issued July 10, 1973 and No. 3,858,393 issued Jan. 7, 1975. However, while this valve is effective in controlling both positive and negative loads it still utilizes a controlling orifice located between the pump and the motor during positive load mode of operation and therefore controls the fluid flow into the fluid motor instead of controlling fluid flow out of the fluid motor, which approach carries distinct advantages.

SUMMARY OF THE INVENTION

It is therefore a principal object of this invention to provide an improved load responsive fluid valve that retains its control characteristics when controlling a positive load, while responding to fluid flow out of a fluid motor.

Another object of this invention is to provide an improved load responsive fluid valve that retains its flow characteristics when controlling both positive and negative loads, while responding to fluid flow out of a fluid motor.

It is another object of this invention to provide an improved load responsive fluid valve, which can control a multiplicity of positive and negative loads.

It is a further object of this invention to provide a load responsive fluid valve, which uses a single controlling element for controlling positive and negative loads.

It is a further object of this invention to provide a load responsive control, which automatically varies the pump displacement in response to the exhaust pressure of the motor.

Briefly the foregoing and other additional objects and advantages of this invention are accomplished by providing a novel load responsive flow control valve, constructed according to the present invention for use in a load responsive hydraulic system. A load responsive flow control valve is positioned between the pump and each motor. Each valve has an automatic inlet throttling section responsive to fluid flow out of the motor. When negative loads are encountered each valve can be equipped with an outlet throttling section. When control of multiplicity of loads at the same time is required each valve has both an automatic throttling inlet section and an outlet throttling section on a single controller permitting retention of flow control characteristics, with simultaneous control of loads both positive and negative. When higher system efficiency is required, the variable pump displacement is regulated in respect to a load pressure signal, transmitted from the valve and the valve has automatic inlet throttling and outlet throttling sections, responsive to the pressure in exhaust fluid flowing out of the motor.

DESCRIPTION OF THE PREFERRED EMBODIMENTS.

Figure 1:
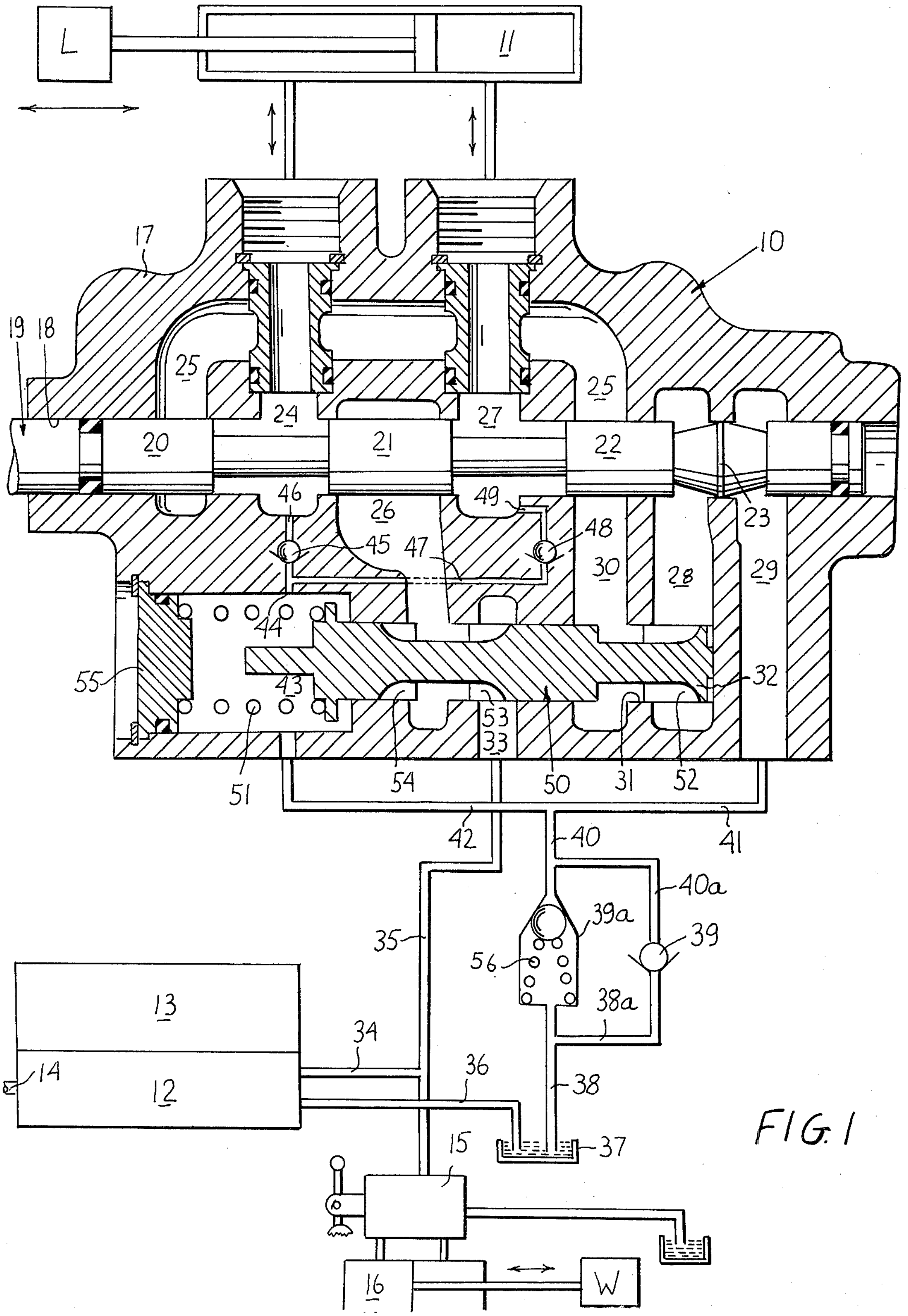
FIG. 1 is a longitudinal sectional view of one embodiment of a flow control valve including the throttling controller used for controlling positive and negative loads responsive to down stream pressure with lines, pressure compensated variable displacement pump, reservoir and another load responsive valve system shown diagramatically.

Referring now to the drawings, and for the present to FIG. 1, one embodiment of a load responsive flow control valve, generally designated as 10, is shown interposed between diagramatically shown first fluid motor 11 driving a load L, and a variable flow pump 12 equipped with pressure compensated control 13, well known in the art. The pressure compensated control automatically varies displacement of the variable flow pump to maintain a constant maximum preselected pressure level of the system. The variable flow pump 12 is driven through shaft 14 by a suitable prime mover, not shown. Another load responsive flow control valve 15, identical to load responsive flow control valve 10 is interposed between the variable flow pump 12 and a second fluid motor 16 driving a second load W.

The load responsive flow control valve 10 is a four-way type and has a housing 17 provided with a bore 18 axially guiding a valve spool, generally designated as 19. The valve spool 19 is equipped with isolating lands 20, 21 and 22 and a metering land 23. With valve spool 19 in neutral position as shown in FIG. 1, land 20 isolates load chamber 24 from outlet chamber 25, land 21 isolates supply chamber 26 from load chambers 24 and 27, land 22 isolates outlet chamber 25 from load chamber 27 and first exhaust chamber 28 and metering land 23 isolates first exhaust chamber 28 from second exhaust chamber 29. The outlet chamber 25 is crossconnected through passage 30 and bore 31 guiding control spool 32 to first exhaust chamber 28. The supply chamber 26 is cross-connected through bore 31 and control spool 32 to an inlet chamber 33.

The outlet of the variable flow pump 12 is connected through discharge lines 34 and 35 to inlet chamber 33. The inlet to the variable flow pump 12 is connected through line 36 to diagramatically shown reservoir 37. Reservoir 37 is also connected through lines 38 and 38*a*, check valve 39, lines 40*a*, 40 and 41 to the second exhaust chamber 29 and through line 42 to exhaust space 43 formed in the housing 17. Low pressure relief valve 39*a* is interposed between line 40 and line 38 connected to reservoir 37. Exhaust space 43 communicates through line 44, check valve 45 and line 46 with load chamber 24 and also through lines 44 and 47, check valve 48 and line 49 with load chamber 27.

Preferably the size and position of the lands are such that movement of valve spool 19 to the right, from the position as shown, will first connect load chamber 27 with outlet chamber 25 and then connect supply chamber 26 with load chamber 24, the metering land 23 still isolating first exhaust chamber 28 from second exhaust chamber 29. Further movement of the valve spool 19 to the right will gradually open passage between first exhaust chamber 28 and second exhaust chamber 29, the area of fluid flow between these two chambers gradually increasing with displacement of valve spool 19. Movement of valve spool 19 to the left will first connect load chamber 24 with outlet chamber 25 and then connect supply chamber 26 with load chamber 27. Further movement of valve spool 19 to the left will gradually open passage between first exhaust chamber 28 and second exhaust chamber 29, the area of flow between those two chambers gradually increasing with displacement of valve spool 19.

A fluid throttling control, generally designated as 50, has spool 32 guided in bore 31. At one end, (the right as viewed in FIG. 1), the spool 32 is subjected to pressure existing in the first exhaust chamber 28. The other end of spool 32, communicating with exhaust space 43, is subjected to the pressure existing in space 43 and to the biasing force of control spring 51. The spool 32 is equipped with first throttling slots 52 communicating outlet chamber 25 with first exhaust chamber 28, second throttling slots 53 communicating inlet chamber 33 with supply chamber 26 and bypass slots 54 located between supply chamber 26 and exhaust space 43. Increase in pressure differential between first exhaust chamber 28 and exhaust space 43, acting on the cross sectional area of spool 32, will first balance the preload of control spring 51 and then move the spool 32 from right to left. The location of the throttling slots is such that initial movement of the spool 32 will gradually reduce the passage area between inlet chamber 33 and supply chamber 26, throttling the fluid flow between those chambers until passage between those two chambers closes. Further movement of spool 32 to the left will connect supply chamber 26 with exhaust space 43, while a full flow passage is still maintained between outlet chamber 25 and first exhaust chamber 28, through the first throttling slots 52. Still further movement of spool 32 to the left will gradually reduce the passage between outlet chamber 25 and first exhaust chamber 28, throttling the fluid flow between those chambers, until passage between those two chambers closes. This movement of spool 32 to the left will also gradually increase the area of communication between supply chamber 26 and exhaust space 43 through by pass slots 54, while still isolating inlet chamber 33 from supply chamber 26.

Assume that the valve spool 19 is moved from left to right from the position shown in FIG. 1. This will first communicate the load chamber 27 with outlet chamber 25 and then communicate load chamber 24 with supply chamber 26, while metering land 23 still isolates first exhaust chamber 28 from second exhaust chamber 29. Assume also that load chamber 24 is subjected to a pressure of positive load. High pressure fluid, at a pressure level determined by the setting of the pressure compensator control 13, will be supplied from supply chamber 26 to load chamber 24 and to fluid motor 11, where it will overcome the resistance of load L. Since the outlet of fluid motor 11 is connected through load chamber 27 and outlet chamber 25 to first exhaust chamber 28 which is blocked by metering land 23, in a well known manner, the pressure in the load chamber 27, outlet chamber 25, and first exhaust chamber 28 will begin to rise. This increased pressure in the first exhaust chamber 28 will equal the difference between the pressure in load chamber 24 (which is connected to supply chamber 26) and the pressure necessary to support the load L. Increase in pressure in the first exhaust chamber 28, acts on the cross-sectional area of spool 32 and when it reaches the level to overcome the preload in control spring 51 it will move the control spool 32 to the left and close the passage between inlet chamber 33 and supply chamber 26, interrupting the supply of high pressure fluid to supply chamber 26 and load chamber 24. Subjected to the force of the pressure differential existing between first exhaust chamber 28 and exhaust space 43 and the biasing force of the control spring 51 the spool 32 of throttling valve 50 will modulate to maintain a relatively constant pressure differential between first exhaust chamber 28 and exhaust space 43, by regulating the pressure level in the supply chamber 26 and load chamber 24. This relatively constant controlled pressure differential between first exhaust chamber 28 and exhaust space 43 will be approximately equal to the quotient of the preload in control spring 51 at the control position of spool 32 and the cross-sectional area of spool 32. Any rise in pressure in the first exhaust chamber 28 over that equivalent to the relatively constant controlled pressure differential level will move spool 32 to the left into a new modulating position to relieve some of the pressure in supply chamber 26 by cross-connecting it through bypass slots 54 with exhaust space 43, while maintaining communication between inlet chamber 33 and supply chamber 26 closed. Conversely, any decrease in the pressure in first exhaust chamber 28 below that equivalent to the relatively constant controlled pressure differential level will move the spool 32 to the right, first closing communication between supply chamber 26 and exhaust space 43 and then gradually connecting supply chamber 26 with high pressure fluid in inlet chamber 33. Therefore the throttling control 50 will automatically maintain the pressure in first exhaust chamber 28 at a level which will maintain a relatively constant controlled pressure differential between the first exhaust chamber 28 and the exhaust space 43. With varying pressure in exhaust space 43 the throttling controls 50 will automatically vary the pressure in the first exhaust chamber 28 to maintain a relatively constant differential between the first exhaust chamber 28 and the exhaust space 43, approximately equivalent to the quotient of the biasing force of the control spring 51 and the cross-sectional area of spool 32.

Further movement of valve spool 19 to the right, through the displacement of metering land 23, will create an orifice between the first exhaust chamber 28 and the second exhaust chamber 29. Fluid flow will take place through the orifice between those chambers, momentarily lowering pressure in first exhaust chamber 28. The spool 32 of throttling control 50 will change its modulating position, moving from left to right, creating an opening between inlet chamber 33 and supply chamber 26 through second throttling slots 53, throttling the fluid flow between those chambers, to maintain the pressure differential between first exhaust chamber 28 and exhaust space 43 at a relatively constant level. Exhaust space 43 is connected through line 42 with second exhaust chamber 29. Therefore a relatively constant pressure differential will also be maintained by the throttling control 50 between the first exhaust chamber 28 and the second exhaust chamber 29. Since the flow through the orifice at the metering land 23 is proportional to the orifice area, once a relatively constant pressure differential is maintained across the orifice, and since this pressure differential is automatically maintained relatively constant by the throttling control 50, the flow between first exhaust chamber 28 and second exhaust chamber 29 will also be relatively constant for any specific position of valve spool 19 and independent of the load pressure in load chamber 24. Therefore each specific position of valve spool 19, corresponding to a specific orifice area between first exhaust chamber 28 and second exhaust chamber 29, will also correspond to a specific controlled flow level through the load responsive flow control valve 10. The fluid throttling control 50 maintains a relatively constant pressure differential between first exhaust chamber 28 and second exhaust chamber 29, the flow control therefore being independent of the pressure fluctuation in the second exhaust chamber 29. While throttling the fluid flow between the inlet chamber 33 and supply chamber 26 to maintain a relatively constant pressure differential between first and second exhaust chambers, the spool 32 maintains full flow passage between outlet chamber 25 and first exhaust chamber 28, through first throttling slots 52. Sudden increase or decrease in load L, through corresponding momentary decrease or increase in pressure in first exhaust chamber 28, will result in the change in throttling position of the spool 32. In each case with the condition of force equilibrium established, the pressure differential between first and second exhaust chambers will return to its relatively constant controlled level, with the spool 32 modulating in each new position.

The exhaust fluid flow from the second exhaust chamber 29 is transmitted through lines 40 and 41 to the low pressure relief valve 39*a*, which permits the exhaust flow to reach reservoir 37, while maintaining constant minimum pressure level in second exhaust chamber 29, equivalent to the preload of spring 56. This constant minimum pressure level maintains the check valve 39 in a closed position.

Assume that the valve spool 19 is moved from left to right from its neutral as shown in FIG. 1, connecting first load chamber 27 with outlet chamber 25 while land 21 still isolates supply chamber 26 from load chamber 24 and metering land 23 isolates first exhaust chamber 28 from second exhaust chamber 29. Assume also that load chamber 27 is subjected to pressure of a negative load. Negative load pressure will then be transmitted from outlet chamber 25 through passage 30 and first throttling slots 52 to first exhaust chamber 28, where it will react on the cross-sectional area of spool 32 moving it all the way from right to left, compressing the control spring 51 and engaging stop 55. In this position spool 32 will isolate first exhaust chamber 28 from outlet chamber 25, isolate inlet chamber 33 from supply chamber 26 and connect supply chamber 26 with exhaust space 43. When, due to leakage across the metering land 23 which can normally be expected, the pressure in the first exhaust chamber 28 drops to a level equivalent to the biasing force of the compressed control spring 51, the spool 32 will move to the right and start to modulate, throttling the fluid flow from outlet chamber 25 to maintain a relatively constant pressure differential between first exhaust chamber 28 and exhaust space 43, the communication between inlet chamber 33 and supply chamber 26 remaining blocked and supply chamber 26 remaining open through bypass slots 54 to exhaust space 43.

Further movement of the valve spool 19 to the right will first connect supply chamber 26 with load chamber 24, both of which are subjected to low pressure, and then through displacement of metering land 23 will open an orifice between first exhaust chamber 28 and second exhaust chamber 29. The resulting flow between these chambers will momentarily lower the pressure in first exhaust chamber 28, causing an unbalance of forces acting on spool 32. As a result the spool 32 will move from left to right throttling fluid flow from outlet chamber 25 to space 43, the outlet chamber being subjected to pressure of the negative load, to maintain a relatively constant pressure differential between the first exhaust chamber 28 and exhaust space 43 and therefore also a relatively constant pressure differential between first and second exhaust chambers, while the fluid flow through the orifice between those chambers takes place. The spool 32 will modulate to maintain a relatively constant pressure differential between first exhaust chamber 28 and second exhaust chamber 29 in a position at which first throttling slots 52 are partially closed and control spring 51 further compressed and exerting higher biasing force. The relatively constant controlled pressure differential between first exhaust chamber 28 and exhaust space 43 is approximately equal to the quotient of biasing force of control spring 51 and the cross-sectional area of spool 32. Therefore, when controlling a negative load, spool 32 will maintain a relatively constant control pressure differential at a higher level than the controlled pressure differential when controlling a positive type load. As previously described the position of the valve spool 19 and its metering land 23 will determine the area of the orifice between the exhaust chambers and therefore the controlled flow level through the load responsive flow control valve 10 during control of negative load.

The displacement of the fluid from the fluid motor 11 requires equivalent fluid flow into fluid motor 11 to prevent cavitation. When controlling a negative load spool 32 isolates the inlet chamber 33 from the supply chamber 26 but connects the supply chamber 26 with exhaust space 43. The fluid motor exhaust fluid flows from second exhaust chamber 29 through lines 41 and 42 into exhaust space 43, from which it can follow two paths on its way to load chamber 24 and fluid motor 11. The fluid can flow from exhaust space 43 through bypass slots 54 to supply chamber 26 and load chamber 24. The fluid can also flow from exhaust space 43 through line 44, check valve 45 and line 46 to load chamber 24. If the fluid flow from second exhaust chamber 29 is higher than the flow requirement of load chamber 24, part of this flow will be diverted through low pressure relief valve 39*a* and therefore fluid will be supplied to load chamber 24 at a pressure, equivalent to the setting of the load pressure relief valve 39*a*. However, if the flow requirement of the load chamber 24 exceeds the flow from the second exhaust chamber 29, the additional flow is supplied from reservoir 37 through lines 38 and 38*a*, check valve 39 and lines 40*a*, 40 and 42 to the exhaust space 43. Under these conditions the load chamber 24 is subjected to a pressure lower than atmospheric pressure.

If the valve spool 19 is moved from right to left, function of the load chambers 24 and 27 is reversed, for opposite direction of drive, and the roles of the check valves 45 and 48 are reversed, but otherwise the valve functions in the same manner as described above.

The load responsive flow control valve 10 of FIG. 1 is capable of controlling both positive and negative loads, the flow through the valve being proportional to the position of the metering land 23 and therefore position of valve spool 19, irrespective of the magnitude of the controlled load both in positive and negative modes of load operation and in either direction of flow and therefore either direction of the movement of the fluid motor.

Figure 2:
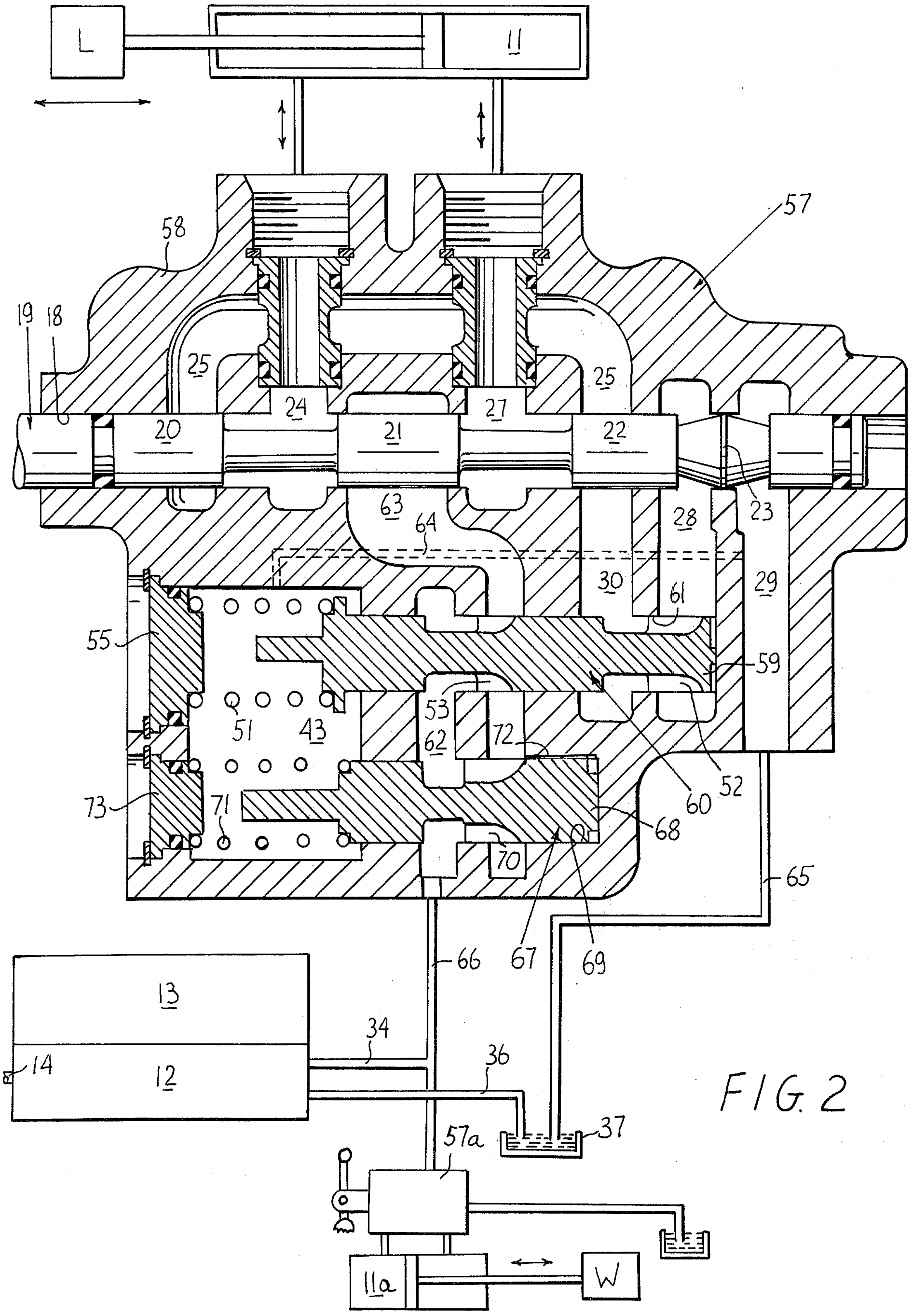
FIG. 2 is a longitudinal sectional view of another embodiment of a flow control valve including the throttling controller used for controlling of positive and negative loads responsive to down stream pressure and a minimum pressure pump inlet throttling control with lines, pressure compensated variable displacement pump, reservoir and another load responsive valve system shown diagramatically.

Referring now to FIG. 2, another embodiment of a load responsive flow control valve, generally designated as 57, is shown interposed between diagramatically shown fluid motor 11 driving a load L and a variable flow pump 12, equipped with pressure compensated control 13, well known in the art. The pressure compensated control automatically varies displacement of the variable flow pump to maintain a constant maximum preselected pressure level of the system. The variable flow pump 12 is driven through shaft 14 by a suitable prime mover, not shown. Another load responsive flow control valve 57a is interposed between the variable flow pump 12 and a fluid motor 11a driving a load W.

The load responsive flow control valve 57 is generally similar to the load responsive flow control valve 10 of FIG. 1. Valve housing 58 is provided with a bore 18 which axially guides valve spool, generally designated as 19, which is identical in its function and configuration to valve spool 19 of FIG. 1 and has already been described in detail. Throttling control 60 of FIG. 2 is generally similar to throttling control 50 of FIG. 1. Control spool 59 axially guided in bore 61, in the position as shown, cross-connects through first throttling slots 52 outlet chamber 25 and first exhaust chamber 28 and also cross-connects through second throttling slots 53 inlet chamber 62 with supply chamber 63. Spool 59 at one end is subjected to pressure in first exhaust chamber 28 and at the opposite end to pressure in exhaust space 43 and biasing force of control spring 51. Exhaust space 43 is connected through passage 64 with second exhaust chamber 29, which in turn is connected by line 65 to reservoir 37. The inlet chamber 62 is connected through lines 66 and 34 to variable displacement pump 12 Inlet valve, generally designated as 67, has inlet spool 68 axially guided in bore 69. Inlet spool 68 is provided with flow throttling slots 70 cross-connecting supply chamber 63 with inlet chamber 62. Inlet spool 68 at one end is subjected to pressure in supply chamber 63, conducted through a slot 72 and at the opposite end to pressure in exhaust space 43 and the biasing force of spring 71. Width of supply chamber 63 and inlet chamber 62 in the proximity of spool 59 and inlet sppol 68 is substantially greater than the diameter of those spools, so that fluid can flow in respective chambers around those spools.

Assume that the variable delivery pump 12 delivers high pressure fluid to inlet chamber 62. High pressure fluid will be delivered through flow throttling slots 70 of inlet spool 68 and through second throttling slots 53 of spool 59 to supply chamber 63. From supply chamber 63 the high pressure fluid will be transferred through slot 72 and react on the cross-sectional area of inlet spool 68, moving it from right to left against stop 73 and compressing spring 71. In its new position inlet spool 68 will close off flow throttling slots 70, preventing flow through the slots 70 from chamber 62 to supply chamber 63. Fluid flow from the pump can still flow around inlet spool 68 in inlet chamber 62 and inlet chamber 62 is still interconnected with supply chamber 63 through second throttling slots 53 of spool 59. As long as pressure in supply chamber 63 remains higher than the quotient of biasing force of spring 71 and the cross-sectional area of inlet spool 68, inlet spool 68 will remain in its new position. However, a drop in pressure in supply chamber 63, below that as determined by the biasing force of spring 71, will reconnect supply chamber 63 with inlet chamber 62 through flow throttling slots 70. If the passage between inlet chamber 62 and supply chamber 63 through second throttling slots 53 is blocked by spool 59, the inlet spool 68 will modulate, throttling fluid flow from inlet chamber 62 to supply chamber 63 to maintain supply chamber 63 at a relatively constant pressure level, approximately equal to the quotient of biasing force of spring 71 and cross-sectional area of inlet spool 68.

Assume that valve spool 19 is moved from left to right from its neutral position, as shown in FIG. 2, first connecting load chamber 27 with outlet chamber 25 and then connecting supply chamber 63 with load chamber 24, while the metering land 23 still isolates first exhaust chamber 28 from second exhaust chamber 29. Assume also that load chamber 24 is subjected to pressure of positive load. High pressure fluid from supply chamber 63 will flow into load chamber 24 and the fluid motor. Since the outlet of the fluid motor 11, although connected through load chamber 27 and outlet chamber 25 to first exhaust chamber 28, is blocked by metering land 23, in a well known manner the pressure in first exhaust chamber 28 will start to increase. Increase in pressure in first exhaust chamber 28 will move spool 59 of throttling valve 60 from right to left against biasing force of control spring 51 to a position, at which the second throttling slots 53 are blocked and blocking flow through slots 53 between inlet chamber 62 and supply chamber 63. In a manner as described when referring to FIG. 1, spool 59 will modulate providing leakage flow across metering land 23 and maintaining a relatively constant pressure differential between first exhaust chamber 28 and exhaust space 43 and therefore also the same relatively constant pressure differential between first exhaust chamber 28 and second exhaust chamber 29.

Further movement of valve spool 19 from left to right will open an orifice across the metering land 23. In a manner, as previously described when referring to FIG. 1, the spool 59 will modulate, regulating pressure in load chamber 24 to maintain a relatively constant pressure differential between first exhaust chamber 28 and second exhaust chamber 29 and therefore maintaining a relatively constant pressure differential across the orifice, created by displacement of the metering land 23. The fluid flow through this orifice will be proportional to the area of the orifice and constant for each specific area, irrespective of the change in magnitude of load L and the corresponding change in load pressure in load chamber 24. Since the area of the orifice is determined by the displacement of the metering land 23, each position of valve spool 19 will correspond to a certain specific controlled flow level through the load responsive flow control valve 57, irrespective of the variation in the magnitude of the controlled positive load.

Assume that the valve spool 19 is moved from left to right from its neutral position as shown in FIG. 2, first connecting load chamber 27 with outlet chamber 25, while land 21 still isolates supply chamber 63 from load chamber 24 and metering land 23 isolates first exhaust chamber 28 from second exhaust chamber 29. Assume also that load chamber 27 is subjected to pressure of a negative load. Negative load pressure will then be transmitted from outlet chamber 25 through passage 30 and first throttling slots 52 to first exhaust chamber 28, where it will react on the cross-sectional area of spool 59, moving it all the way from right to left, compressing control spring 51 and engaging stop 55. In this position spool 59 will isolate first exhaust chamber 28 from outlet chamber 25 and block flow through slots 53 between inlet chamber 62 and supply chamber 63. When, due to leakage across the metering land 23, the pressure in first exhaust chamber 28 drops, the spool 59 will move to a modulating position maintaining, as previously described when referring to FIG. 1, a relatively constant pressure differential between first exhaust chamber 28 and second exhaust chamber 29, approximately equal to the quotient of the biasing force of control spring 51 and the cross-sectional area of spool 59. Since in this modulating position spool 59 blocks second throttling slots 53, blocking fluid flow through slots 53 between supply chamber 63 and inlet chamber 62, in a manner as previously described, the inlet spool 68 of inlet valve 67 will modulate, throttling fluid through flow throttling slot 70 and maintaining supply chamber 63 at a minimum controlled pressure level, approximately equal to the quotient of the biasing force of spring 71 and the cross-sectional area of spool 68.

Further movement of the valve spool 19 from left to right will first connect supply chamber 63 with load chamber 24, increasing the pressure in load chamber 24 to the minimum controlled pressure level maintained by inlet valve 67. Still further movement of valve spool 19, through displacement of metering land 23, will move metering land 23 to open an orifice between the first exhaust chamber 28 and the second exhaust chamber 29. In a manner as previously described when referring to FIG. 1, the spool 59 will modulate by throttling fluid from outlet chamber 25 to first exhaust chamber 28 to maintain a relatively constant pressure differential between first and second exhaust chambers and across the orifice created by displacement of the metering land 23. This relatively constant pressure differential will approximately equal the quotient of the biasing force of the compressed control spring 51 and the cross-sectional area of spool 59. As previously described this relatively constant control pressure differential, when controlling a negative load will be higher than the relatively constant control pressure differential during control of a positive load.

While the negative load is being controlled by controlling the fluid flow out of fluid motor 11, equivalent flow to the other port of fluid motor 11 will be supplied, at a relatively constant minimum pressure level as controlled by the throttling action of inlet valve 67.

Therefore when controlling a negative load, with pressure differential maintained relatively constant across the orifice created by displacement of the metering land 23, each position of valve spool 19 will correspond to a specific control flow level across the load responsive flow control valve 57, irrespective of the variation in the magnitude of the negative load. While a negative load is being controlled the make up flow to the fluid motor will be automatically maintained at a relatively constant minimum controlled pressure level to prevent cavitation of the fluid motor.

Figure 3:
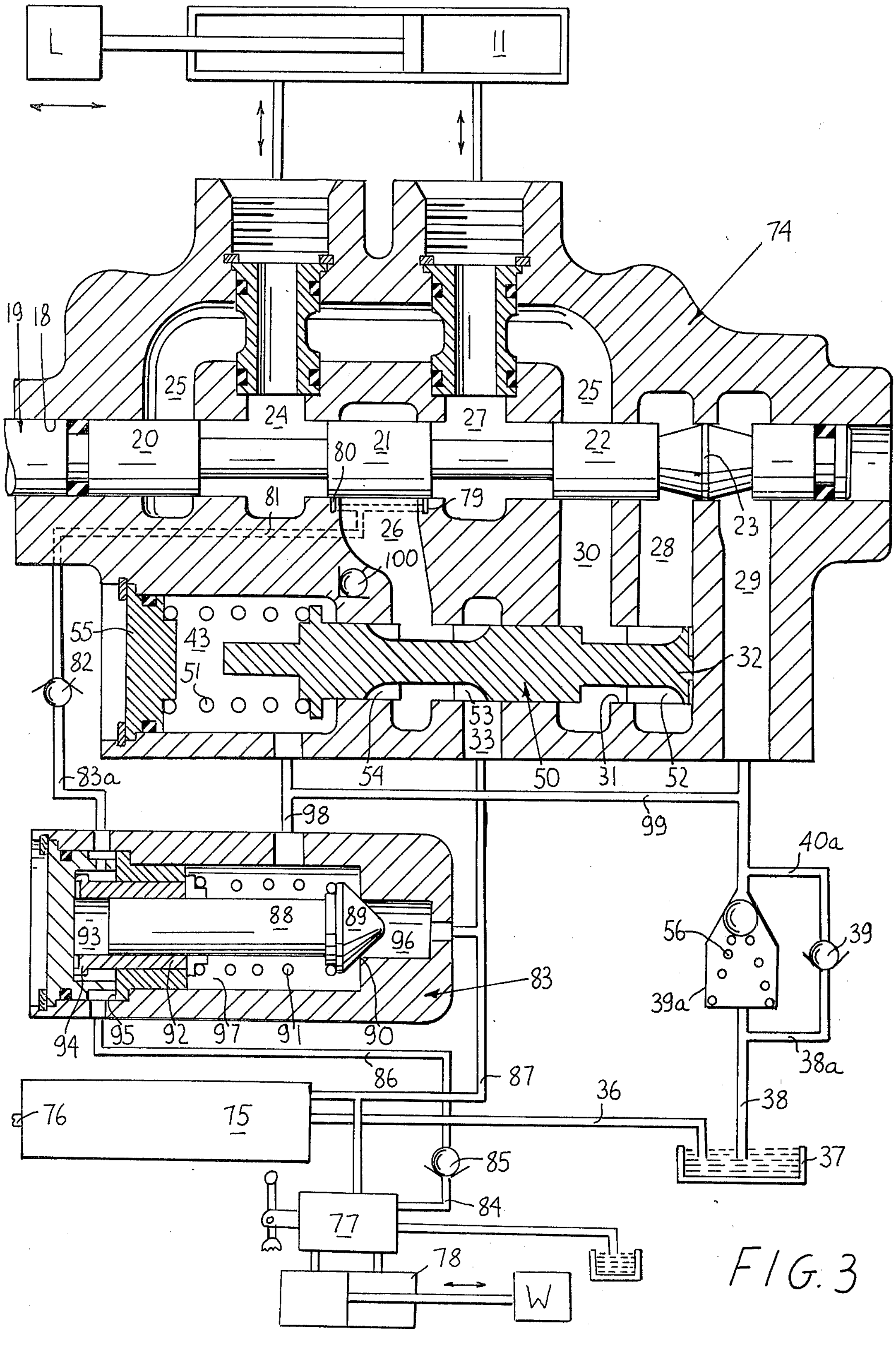
FIG. 3 is a longitudinal sectional view of the flow control valve shown in FIG. 1 equipped with cylinder pressure sensing ports used in a multiple load system utilizing common bypass valve with lines, pump and reservoir shown diagramatically.

Referring now to FIG. 3 another embodiment of a load responsive flow control valve, gernerally designated as 74, is shown interposed between diagramatically shown fluid motor 11 driving a load L and a fixed displacement pump 75, driven through shaft 76 by a prime mover, now shown. Another load responsive flow control valve 77 is interposed between the fixed displacement pump 75 and a fluid motor 78 driving a load W.

The load responsive flow control valve 74 is generally similar to the load responsive flow control valve 10 of FIG. 1. Fluid throttling control 50 of FIG. 3 is identical in its function and configuration to the fluid throttling control 50 of FIG. 1. The valve spool 19, axially guided in bore 18 of FIG. 3, is similar in its function and configuration to valve spool 19 and bore 18 of FIG. 1, with the following exception. Two load sensing ports 79 and 80 are provided in load responsive flow control valve 74. Load sensing port 79 is located between load chamber 27 and supply chamber 26, load sensing port 80 being located between load chamber 24 and supply chamber 26. Load sensing ports 79 and 80 are blocked by land 21 in the neutral position of valve spool 19. Movement of valve spool 19 from its neutral position, from left to right, will connect load chamber 24 with load sensing port 80, before connecting load chamber 24 with supply chamber 26. Movement of valve spool 19 from right to left will connect load sensing port 79 with load chamber 27, before connecting load chamber 27 with supply chamber 26. With valve spool 19 displaced from its neutral position in either direction, pressure signal from load chamber 24 or 27 is transmitted through load sensing ports 80 or 79 and passage 81, check valve 82 and line 83*a* to a differential pressure relief valve generally designated as 83. Similarly signal of load chamber pressure is transmitted from load responsive flow control valve 77 through line 84, check valve 85 and line 86 to differential pressure relief valve 83. In a well known manner, only the higher of the load pressure signals will be transmitted through one of the check valves 82 or 85 to the differential pressure relief valve 83, the other check valve blocking the reverse flow into the lower pressure zone. Therefore the differential pressure relief valve 83 will respond to the highest system load.

Referring now the differential pressure relief valve, generally designated as 83, a control plunger 88 with a conical head 89 is biased towards engagement with opening 90 by a spring 91. Control plunger 88 is guided in a force sleeve 92 which at one end is subjected to the reaction force of spring 91 and pressure in space 97. The other end of force sleeve 92 extends into space 93, which is connected through check valves 82 and 85 with load sensing ports of load responsive direction control valves 74 and 77. Space 97 is connected through lines 98 and 99 to low pressure relief valve 39a, which communicates directly through line 38 with reservoir 37. Therefore the pressure in space 97 is dictated by the pressure setting of the low pressure relief valve 39*a*. Control plunger 88 with its conical head 89 in its modulating position, creates a bypass orifice, cross-connecting passage 96 and exhaust space 97. The cross-sectional area of opening 90 is made the same as cross-sectional area of control plunger 88. Control plunger 88 is subjected to control signal pressure in space 93 and force of the spring 91 in one direction, urging the conical head 89 in contact with opening 90 and is also subjected to pressure in passage 96, which creates the opposite direction, urging the conical head 89 away from the opening 90 and therefore to create a flow passage between the passage 96 and exhaust space 97. Subjected to those forces the control plunger 88 will modulate, controlling the bypass flow of fluid from the fixed displacement pump 75 to exhaust space 97, to maintain passage 96 at a pressure, higher than pressure in space 93, the difference between those pressures being realtively constant and proportional to preload in spring 91. Therefore in the absence of load signal pressure in space 93 and with force sleeve 92 in position as shown in FIG. 3, equivalent to minimum preload in spring 91, the relatively constant pressure differential between passage 96 and space 93 will be at its minimum level. Under those conditions control plunger 88 will modulate bypassing the fluid from fixed displacement pump 75 and therefore from passage 96 to space 97, space 97 being connected through low pressure relief valve 39*a* to reservior 37. Therefore in this bypass condition the flow from the fixed displacement pump 75 will be bypassed to reservoir 37 at a minimum level, which is equal to the pressure differential created by control plunger 88 subjected to biasing force of spring 91, with fixed displacement pump 75 operating under condition of minimum standby loss. The amount of the throttling action of control plunger 88 will be influenced by the pressure setting of the low pressure relief valve 39*a*.

The pressure setting of low pressure relief valve 39*a* is always selected substantially lower than the lowest pressure differential of differential pressure relief valve 83. The pressure setting of the low pressure relief valve 39*a* will influence the amount of throttling actions, to which the bypass fluid is subjected but will not affect the relatively constant pressure differential maintained by the differential pressure relief valve 83 between passage 96 and space 93. As will be seen by those skilled in the art, space 97 can be directly connected to reservoir 37 without the use of low pressure relief valve 39*a*.

Increasing load pressure in space 93, acting on cross-sectional area of force sleeve 92, will overcome the effect of low pressure in space 97, due to the pressure setting of low pressure relief valve 39a and the biasing force of spring 91, moving force sleeve 92 from left to right, until stop 94 engages surface 95 and the preload in spring 91 will increase to a specific predetermined level, corresponding to a normal working pressure differential, to be maintained by control plunger 88 between passage 96 and space 93. Under those conditions control plunger 88 will modulate diverting the excess flow from fixed displacement pump 75 to maintain a relatively constant pressure differential between the load pressure signal in space 93 and the discharge pressure of fixed displacement pump 75. This relatively constant pressure differential will be approximately equal to the quotient of the biasing force of spring 91 and the cross-sectional area of control plunger 88. Therefore the differential relief valve 83 will automatically maintain the discharge pressure of fixed displacement pump 75 higher by a relatively constant pressure differential than the highest load pressure signal transmitted from load responsive flow control valves 74 and 77.

Assume that valve spool 19 is moved from left to right from its neutral position as shown in FIG. 3, connecting load chamber 27 with outlet chamber 25 and also connecting pressure sensing port 80 to load chamber 24, while metering land 23 still isolates first exhaust chamber 28 from second exhaust chamber 29. Assume also that load chamber 24 is subjected to pressure of a positive load. In a manner as previously described, the load pressure signal from load chamber 24 will be transmitted to space 93 and the differential pressure relief valve 83 will maintain the discharge pressure of fixed displacement pump 75 at a pressure, higher by a relatively constant pressure differential, than the load pressure in load chamber 24. The pressure of the fixed displacement pump 75 will be transmitted through line 87 to inlet chamber 33, from which it will be transmitted through second throttling grooves 53 to supply chamber 26.

Further movement of valve spool 19 to the right will connect load chamber 24 with supply chamber 26, while the metering land 23 still isolates first exhaust chamber 28 from second exhaust chamber 29. Influenced by the signal pressure transmitted from load sensing port 80 to differential relief valve 83, the pressure in the load chamber 24 will continue to increase above the load pressure level, as determined by load L. Since the outlet of fluid motor 11, connected through load chamber 27 and outlet chamber 25 to first exhaust chamber 28 is blocked by metering land 23, in a well known manner the pressure in the first exhaust chamber 28 will start to increase. Increase in pressure in first exhaust chamber 28 willmove spool 32, of throttling valve 50 from right to left, against the biasing force of control spring 51 to a position, at which the second throttling slots 53 are blocked and communication between inlet chamber 33 and supply chamber 26 is interrupted. In a manner as described when referring to FIG. 1, spool 32 will modulate, providing leakage flow across metering land 23 and maintaining a relatively constant pressure differential between first exhaust chamber 28 and exhaust space 43 and therefore also the same relatively constant pressure differential between first exhaust chamber 28 and second exhaust chamber 29. In this modulating position the spool 32 will throttle the fluid flow from inlet chamber 33 to supply chamber 26, thus reducing load signal pressure, transmitted from load sensing port 80 to differential pressure relief valve 83. Therefore under those conditions a state of equilibrium is established, in which differential pressure relief valve 83 maintains discharge pressure of fixed displacement pump 75 at a sufficiently high level, to maintain a constant pressure differential between first exhaust chamber 28 and second exhaust chamber 29, while the pressure drop due to throttling of fluid across second throttling slots 53 approximately equals the relatively constant controlling pressure differential, maintained by the differential pressure relief valve 83.

Further movement of valve spool 19 from left to right will open an orifice across the metering land 23. In a manner as previously described when referring to FIG. 1, the spool 32 will modulate, regulating pressure in load chamber 24, to maintain a relatively constant pressure differential between first exhaust chamber 28 and second exhaust chamber 29 and therefore maintaining a relatively constant pressure differential across the orifice, created by displacement of metering land 23. The relationship between the required pressure in load chamber 24 and supply chamber 26 to the discharge pressure of the fixed displacement pump 75 will be maintained by the differential pressure relief valve 83, with the pressure drop in fluid, throttled by the second throttling grooves 53, being approximately equal to the relatively constant pressure differential developed across differential pressure relief valve 83. Therefore while spool 32 modulates, to maintain the pressure differential between first exhaust chamber 28 and second exhaust chambeer 29 at a relatively constant level, the differential pressure relief valve 83 modulates to adjust the pressure of fixed displacement pump 75 to maintain a relatively constant pressure drop across second throttling slots 53. Since the pressure differential across the orifice created by displacement of the metering land 23 is maintained by controls of load responsive flow control valve 74 relatively constant the fluid flow through the orifice will then be proportional to the area of the orifice and constant for each specific area, irrespective of the change in the magnitude of load L and corresponding change in load pressure in load chamber 24. Since the area of orifice is determined by the displacement of the metering land 23, each position of valve spool 19 will correspond to a certain specific controlled flow level through the load responsive flow control valve 74, irrespective of the variation in the magnitude of the controlled positive load.

Assume that load responsive flow control valve 77 operates a higher positive load than that being controlled by load responsive flow control valve 74. In a manner as previously described, check valve 82 will remain closed, preventing transmittal of the load signal from load sensing port 80 and the pressure in the inlet chamber 33 will rise well above the requirement of load L. In a manner as previously described when referring to FIG. 1, the spool 32 will move to a new modulating position, throttling the fluid flow by second throttling slots 53 from inlet chamber 33 to supply chamber 26, to maintain a relatively constant pressure differential between first exhaust chamber 28 and second exhaust chamber 29.

Assume that valve spool 19 is moved from left to right from its neutral position as shown in FIG. 3, first connecting load chamber 27 with outlet chamber 25 and load chamber 24 with load sensing port 80, while metering land 23 still isolates first exhaust chamber 28 from second exhaust chamber 29. Assume also that load chamber 27 is subjected to pressure of a negative load. Negative load pressure will then be transmitted from outlet chamber 25 through passage 30 and first throttling slots 52 to first exhaust chamber 28, where it will react on the cross-sectional area of spool 32, moving it all the way from right to left, compressing control spring 51 and engaging stop 55. In this position spool 32 will isolate first exhaust chamber 28 from outlet chamber 25 and then isolate inlet chamber 33 from supply chamber 26, while connecting supply chamber 26 with space 43 through bypass slots 54. As soon as, due to leakage across metering land 23, the pressure in first exhaust chamber 28 drops, the spool 32 will move to a modulating position, maintaining as previously described when referring to FIG. 1, a relatively constant pressure differential between the first exhaust chamber 28 and the second exhaust chamber 29, approximately equal to the quotient of the biasing force of control spring 51 and the cross-sectional area of spool 32. Since load chamber 27 is subjected to a negative load, load chamber 24 is maintained at low pressure. Therefore pressure signal transmitted through load sensing ports 80 will not affect the operation of differential relief valve 83, the differential relief valve 83 bypassing the flow out of fixed displacement pump 75 at a minimum pressure level.

Further movement of valve spool 19 from left to right will first connect supply chamber 26 with load chamber 24 and then create an orifice between first exhaust chamber 28 and second exhaust chamber 29, through displacement of metering land 23. In a manner as previously described when referring to FIG. 1, the spool 32 will modulate, throttling fluid flow from outlet chamber 25 to first exhaust chamber 28, to maintain a relatively constant pressure differential between first and second exhaust chambers and across the orifice created by displacement of the metering land 23. This relatively constant pressure differential will approximately equal the quotient of the biasing force of the compressed control spring 51 and cross-sectional area of spool 32.

While negative load is being controlled by controlling the fluid flow out of fluid motor 11, equivalent flow to the other port of fluid motor 11 will be supplied from space 43, maintained at the pressure setting of the low pressure relief valve 39*a*, through check valve 100 and bypass slots 54.

Therefore when controlling a negative load, with pressure differential maintained relatively constant across the orifice created by displacement of the metering land 23, each position of valve spool 19 will correspond to a specific control flow level across the load responsive flow control valve 74, irrespective of the variation in the magnitude of the negative load.

Figure 4:
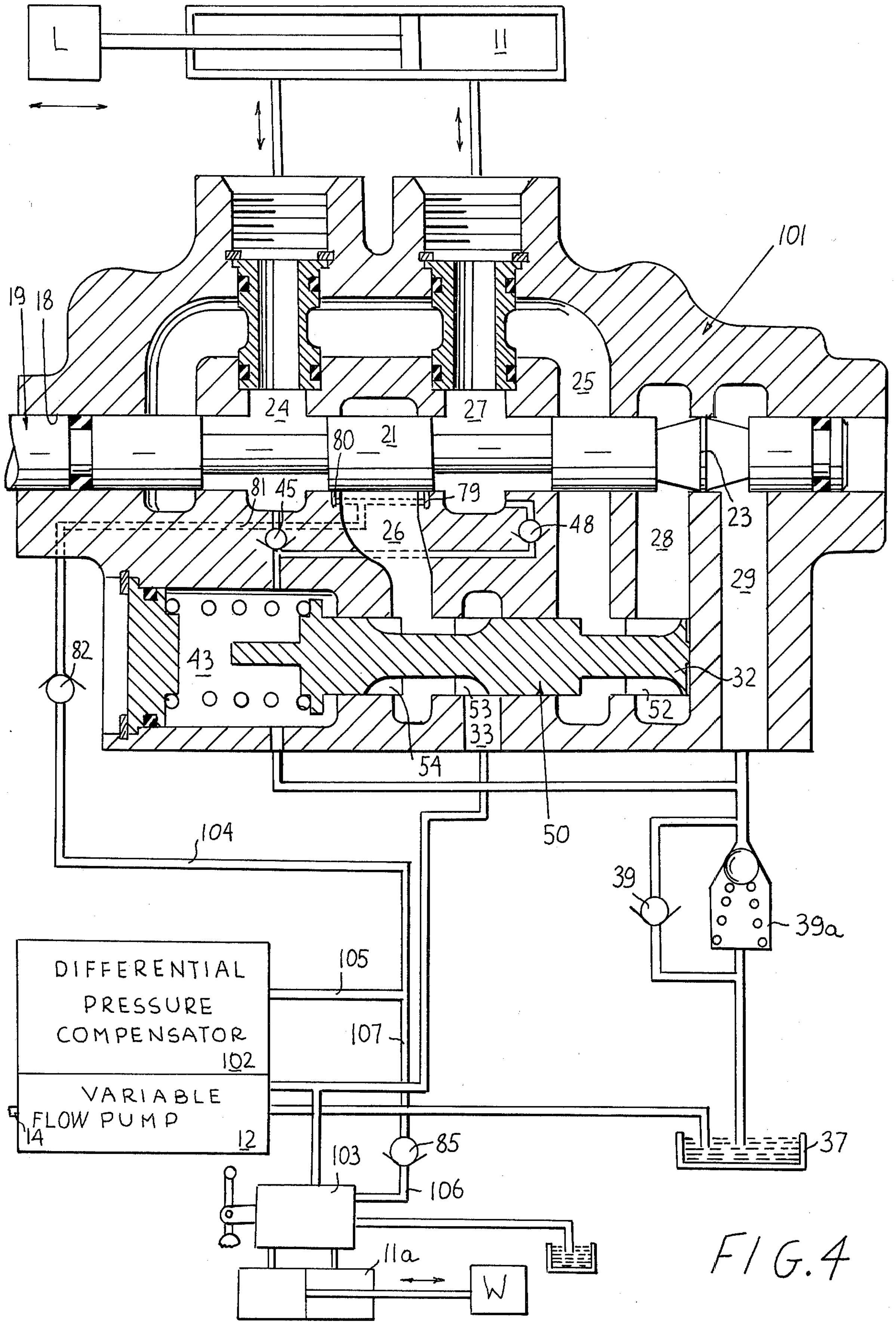
FIG. 4 is a longitudinal sectional view of the flow control valve shown in FIG. 1 equipped with cylinder pressure sensing ports with lines, variable displacement pump equipped with differential pressure compensator, reservoir and another load responsive valve system shown diagramatically.

Referring now to FIG. 4, another embodiment of a load responsive flow control valve, generally designated as 101, is shown interposed between diagramatically shown fluid motor 11 driving load L and a variable flow pump 12, equipped with a differential pressure compensated control 102. The differential pressure compensated control automatically varies displacement of variable flow pump, to maintain a pump discharge pressure higher, by a constant pressure differential, than the pressure required by the load the pump is supplying. The variable flow pump 12 is driven through shaft 14 by a suitable prime mover, not shown. Another load responsive flow control valve 103 is interposed between variable flow pump 12 and fluid motor 11*a* driving a load W. The load responsive flow control valve 101 is generally similar to the flow control valve 74 of FIG. 3. Valve spool 19 and throttling control 50 of FIG. 3 are identical in their function and configuration to valve spool 19 and throttling control 50 of FIG. 4. As in FIG. 3 load sensing ports 80 and 79 of FIG. 4 are connected by passage 81 to check valve 82. However, in FIG. 4 check valve 82 is connected by lines 104 and 105 with differential pressure compensator control 102 of variable flow pump 12. Similarly signal pressure is transmitted from load responsive flow control valve 103 through line 106, check valve 85 and lines 107 and 105 to differential pressure compensator 102. In a well known manner check valve 85 or 82 will transmit the higher of the two load pressure signals to the differential pressure compensator 102, the other check valve blocking the higher pressure signal from the lower pressure zone. Therefore differential pressure compensator control will respond to the highest system load.

The control of positive load by the load responsive flow control valve 101 of FIG. 4 is identical to that of load responsive flow control valve 74 of FIG. 3. Both of those load responsive valves are supplied with pump pressure higher by a constant pressure differential than the load pressure signal. The difference in the embodiments of FIG. 4 and FIG. 3 is in the way this constant pressure differential, between pump discharge pressure and the load pressure is maintained. In FIG. 3 the pump discharge pressure is regulated in response to load pressure signal by diverting a portion of the pump flow, by a differential pressure relief valve to system reservoir. In FIG. 4 the discharge pressure of the variable pump is regulated in response to the load pressure signal by change in the pump displacement, through a special load responsive control, known in the art as a differential pressure compensator.

During control of a positive load fluid throttling control 50, by regulating pressure in load chamber 24 or 27 maintains a relatively constant pressure differential between first exhaust chamber 28 and second exhaust chamber 29. At the same time variable flow pump, responding to laod pressure signal, maintains a constant pressure difference through second throttling slots 53 located between inlet chamber 33 and supply chamber 26. Then as previously described each specific position of valve spool 19 will correspond to a specific constant controlled flow level through the load responsive flow control valve 101 irrespective of the variation in the magnitude of the controlled load.

When controlling a negative load the basic operation of the embodiment of FIG. 4 is identical to that of FIG. 3. The make up fluid however is supplied through check valves 45 and 48 of FIG. 4 located between space 43 and respective load chambers 24 and 27 instead of by check valve 100 of FIG. 3 located between space 43 and supply chamber 26.

The load responsive flow control valve 101 of FIG. 4 is capable of controlling both positive and negative loads, the flow through the valve being proportional to the position of the metering land 23 and therefore position of valve spool 19, irrespective of the magnitude of the controlled load both in positive and negative modes of operation and in either direction of flow and therefore in either direction of the movement of the fluid motor.

Although the basic performance of load responsive flow control valve 101 of FIG. 4 is identical to load responsive flow control valve 74 of FIG. 3, the system of FIG. 4 is more efficient since instead of bypassing an excess of pressurized fluid it delivers only the exact required quantity of pressurized fluid.

Although preferred embodiments of this invention have been shown and described in detail it is recognized that the invention is not limited to the precise form and structure shown and various modifications and rearrangements as will readily occur to those skilled in the art upon full comprehension of this invention may be resorted to without departing from the scope of this invention as defined by the claims.

What is claimed is;

1. A valve assembly comprising a housing having a fluid inlet chamber, a fluid supply chamber, first and second fluid load chambers, a fluid outlet chamber, a fluid exhuast chamber, and fluid exhaust means, first valve means for selectively interconnecting said fluid load chambers with said fluid supply chamber and said fluid outlet chamber, variable fluid metering means between said fluid exhaust chamber and said fluid exhaust means, first throttling means responsive to pressure in said exhaust chamber and operable to control fluid flow from said fluid inlet chamber to said fluid supply chamber to maintain said pressure in said fluid exhaust chamber at a first relatively constant preselected level when one of said fluid load chambers in interconnected with said fluid outlet chamber and when pressure in said outlet chamber is at said first relatively constant preselected level, and second throttling means responsive to pressure in said fluid exhaust chamber and operable to control fluid flow from said fluid outlet chamber to said fluid exhuast chamber to maintain said pressure in said fluid exhaust chamber at a second relatively constant preselected level when one of said fluid chambers is interconnected with said fluid outlet chamber and when pressure in said fluid outlet chamber is higher than said second preselected pressure level.

2. A valve assembly as set forth in claim 1 wherein bypass valve means interconnects said fluid inlet chamber and said fluid supply chamber and is operable to maintain said fluid supply chamber at a constant minimum preselected pressure level when said first throttling means isolates said fluid supply chamber from said fluid inlet chamber.

3. A valve assembly as set forth in claim 1 wherein a differential relief valve means interconnects said fluid inlet chamber and said fluid exhaust means and is operable to maintain pressure in said fluid inlet chamber at a level higher than pressure in said fluid load chamber when said fluid load chamber and said fluid supply chamber are interconnected by said first valve means.

4. A valve assembly as set forth in claim 1 wherein said variable fluid metering means has flow varying means responsive to movement of said first valve means.

5. A valve assembly as set forth in claim 1 wherein said first valve means includes a valve spool axially guided in a spool bore and movable from a neutral position to at least one actuated position, said valve spool having means isolating said load chambers from said fluid supply chamber and said fluid outlet chamber and isolating said fluid exhaust chamber from said fluid exhaust means when in its neutral position.

6. A valve assembly as set forth in claim 5 wherein said fluid metering means has a metering land means located on said valve spool between said fluid exhaust chamber and said fluid exhaust means, said metering land means being movable from a neutral position to at least one control position and when in neutral position said metering land means isolating said fluid exhaust chamber from said fluid exhaust means.

7. A valve assembly as set forth in claim 6 wherein said metering land means includes variable orifice means, said variable orifice means being varied in respect to axial displacement of said valve spool.

8. A valve assembly as set forth in claim 1 wherein said first and second throttling means are located on a second valve means, said second valve means being responsive to fluid pressure in said fluid exhaust chamber.

9. A valve assembly as set forth in claim 1 wherein anticavitation check valve means interconnect for one way fluid flow said first and second fluid load chambers with said fluid exhaust means.

10. A valve assembly as set forth in claim 1 wherein anticavitation check valve means interconnect for one way fluid flow said supply chamber and said fluid exhaust means.

11. A valve assembly as set forth in claim 1 wherein exhaust pressure relief valve means throttle fluid flow from said fluid exhaust means.

12. A valve assembly as set forth in claim 8 wherein said second valve means has a bypass means to interconnect said supply chamber and said exhaust means when said supply chamber is blocked from said inlet chamber through said first throttling means.

13. A valve assembly comprising a housing having a fluid inlet chamber, a fluid supply chamber, first and second fluid load chambers, a fluid outlet chamber, a fluid exhaust chamber and fluid exhaust means, first valve means for selectively interconnecting said fluid load chambers with said fluid supply chamber and said fluid outlet chamber, variable metering orifice means between said fluid exhaust chamber and said fluid exhaust means, and second valve means interconnecting said fluid inlet chamber with said fluid supply chamber and said fluid outlet chamber with said fluid exhaust chamber operable responsive to fluid pressure in said fluid exhaust chamber, said second valve means having first and second throttling means, said first throttling means on said second valve means being operable to throttle fluid flow from said fluid inlet chamber to said fluid supply chamber to maintain pressure in said fluid exhaust chamber at a first relatively constant preselected pressure level when one of said fluid load chambers is interconnected with said fluid outlet chamber and said fluid outlet chamber is at said first relatively constant preselected pressure level, said second throttling means on said second valve means being operable to throttle fluid flow from said fluid outlet chamber to said fluid exhaust chamber to maintain pressure in said fluid exhaust chamber at a second relatively constant preselected pressure level when one of said fluid load chambers is interconnected with said fluid outlet chamber and when pressure in said fluid outlet chamber is higher than said second relatively constant preselected pressure level.

14. A valve assembly as set forth in claim 13 wherein said variable fluid metering means has flow varying means responsive to movement of said first valve means.

15. A valve assembly as set forth in claim 13 wherein said first valve means includes a valve spool axially guided in a spool bore and movable from a neutral position to at least one acutated position, said valve spool having means isolating said load chambers from said fluid supply chamber and said fluid outlet chamber and isolating said fluid exhaust chamber from said fluid exhaust means when it its neutral position.

16. A valve assembly as set forth in claim 15 wherein said variable fluid metering means has metering land means located on said valve spool between said fluid exhaust chamber and said fluid exhaust means, said metering land means being movable from a neutral position to at least one control position and when in neutral position said metering land means isolating said fluid exhaust chamber from said fluid exhaust means.

17. A valve assembly as set forth in claim 16 wherein said metering land means includes variable orifice means, said variable orifice means being varied in respect to axial displacement of said valve spool.

18. A valve assembly as set forth in claim 13 wherein said second valve means has means interconnecting said fluid outlet chamber with said fluid exhaust chamber while fluid flow from said inlet chamber to said supply chamber is being throttled by said first throttling means.

19. A valve assembly as set forth in claim 13 wherein said second valve means has means isolating said fluid inlet chamber from said fluid supply chamber when the fluid flow from said fluid outlet chamber to said fluid exhaust chamber is being throttled by said second throttling means.

20. A valve assembly as set forth in claim 13 wherein said second valve means has a control spool guided in a control bore said control spool interconnecting said fluid inlet chamber with said fluid supply chamber and said fluid outlet chamber with said fluid exhaust chamber.

21. A valve assembly as set forth in claim 20 wherein said control spool isolates said fluid supply chamber from said fluid outlet chamber and has first throttling means between said fluid inlet chamber and said fluid supply chamber and second throttling means between said fluid outlet chamber and said fluid exhaust chamber.

22. A valve assembly as set forth in claim 20 further characterized by spring means biasing said control spool to interconnect said fluid inlet chamber with said fluid supply chamber and said fluid outlet chamber with said fluid exhaust chamber, said control spool being biased by pressure in said exhaust chamber towards a fluid throttling position.

23. A valve assembly as set forth in claim 13 wherein anticavitation check valve means interconnect for one way fluid flow said first and second fluid load chambers said fluid exhaust means.

24. A valve assembly as set forth in claim 13 wherein bypass valve means interconnects said fluid inlet chamber and said fluid supply chamber and is operable to maintain said fluid supply chamber at a constant minimum preselected pressure level when said second valve means isolates said fluid supply chamber from said fluid inlet chamber.

25. A valve assembly as set forth in claim 13 wherein said second valve means has bypass means interconnecting said supply chamber and said exhaust means when said supply chamber is isolated from said inlet chamber by said first throttling means.

26. A valve assembly as set forth in claim 13 wherein exhaust pressure relief valve means throttle fluid flow from said fluid exhaust means.

27. A valve assembly comprising a housing having a fluid inlet chamber, a fluid supply chamber, first and second fluid load chambers, a fluid outlet chamber, a fluid exhaust chamber and fluid exhaust means, first valve means for selectively interconnecting said fluid load chambers with said fluid supply chamber and said fluid outlet chamber, variable metering orifice means between said fluid exhaust chamber and said fluid exhaust means, and second valve means interconnecting said fluid inlet chamber with said fluid supply chamber and said fluid outlet chamber with said fluid exhaust chamber operable responsive to fluid pressure in said fluid exhaust chamber, said second valve means having first and second throttling means, said first throttling means on said second valve means being operable to throttle fluid flow from said fluid inlet chamber to said fluid supply chamber to maintain pressure in said fluid exhaust chamber at a first relatively constant preselected pressure level when one of said fluid load chambers is interconnected with said fluid outlet chamber and said fluid outlet chamber is at said first relatively constant preselected pressure level, said second throttling means on said second valve means being operable to throttle fluid flow from said fluid outlet chamber to said fluid exhaust chamber to maintain pressure in said fluid exhaust chamber at a second relatively constant preselected pressure level when one of said fluid load chambers is interconnected with said fluid outlet chamber and when pressure in said fluid outlet chamber is higher than said second relatively constant preselected pressure level, and differential relief valve means interconnecting said fluid inlet chamber and said fluid exhaust means and operable to maintain pressure in said fluid inlet chamber at a level higher by a relatively constant pressure differential than pressure in said fluid load chamber when said fluid load chamber and said fluid supply chamber are interconnected by said first valve means.

28. A valve assembly as set forth in claim 27 wherein said housing includes a pressure signal passage for selectively interconnecting said first and second load chambers with said differential relief valve means by said first valve means.

29. A valve assembly as set forth in claim 28 wherein said first valve means has a valve spool means, said valve spool means having for selectively interconnecting first one of said fluid load chambers with said differential relief valve means through said pressure signal passage and then interconnecting said load chamber with said supply chamber upon movement of said valve spool means.

30. A valve assembly as set forth in claim 28 wherein check valve means is interposed between said pressure signal passage and said differential relief valve means.

31. A valve assembly as set forth in claim 28 wherein said differential relief valve means has means responsive to pressure in said load chamber when said load chamber is connected to said supply chamber.

32. A valve assembly as set forth in claim 28 wherein said second valve means has control spool means, said control spool means having isolating means to isolate said fluid supply chamber from said fluid outlet chamber, first throttling means between said fluid inlet chamber and said fluid supply chamber, and second throttling means between said fluid outlet chamber and said fluid exhaust chamber.

33. A valve assembly comprising a housing having a fluid inlet chamber, a fluid bypass chamber, a fluid supply chamber, first and second fluid load chambers, a fluid outlet chamber, a fluid exhaust chamber and fluid exhaust means, first valve means for selectively interconnecting said fluid load chambers with said fluid supply chamber and said fluid outlet chamber, variable metering orifice means between said fluid exhaust chamber and said fluid exhaust means operable responsive to movement of said first valve means, and second valve means interconnecting said fluid outlet chamber and said fluid exhaust chamber, said fluid inlet chamber and said fluid supply chamber and selectively interconnecting said fluid supply chamber and said fluid bypass chamber responsive to pressure in said fluid exhaust chamber when one of said fluid load chambers is connected to said fluid outlet chamber by said first valve means, said second valve means operable to connect said fluid supply chamber to said fluid bypass chamber and to isolate said fluid supply chamber from said fluid inlet chamber and to throttle fluid flow from said fluid outlet chamber to said fluid exhaust chamber to maintain said fluid exhaust chamber at a relatively constant preselected first and second pressure level.

34. A load responsive control system comprising in combination a variable flow pump having volume output control responsive to a pressure load signal, a fluid motor operating a load, and a valve assembly between said pump and said motor, said valve assembly comprising a housing having a fluid inlet chamber, a fluid supply chamber, first and second fluid load chambers, a fluid outlet chamber, a fluid exhaust chamber, and fluid exhaust means, first valve means for selectively interconnecting said fluid load chambers with said fluid supply chamber and said fluid outlet chamber, variable fluid metering means between said fluid exhaust chamber and said fluid exhaust means, first throttling means responsive to pressure in said exhaust chamber and operable to control fluid flow from said fluid inlet chamber to said fluid supply chamber to maintain said pressure in said fluid exhaust chamber at a first relatively constant preselected level when one of said fluid load chamber is interconnected with said fluid outlet chamber and when pressure in said outlet chamber is at said first relatively constant preselected level, and a second throttling means responsive to pressure in said fluid exhaust chamber and operable to control fluid flow from said fluid outlet chamber to said fluid exhaust chamber to maintain said pressure in said fluid exhaust chamber at a second relatively constant preselected level when one of said fluid chambers is interconnected with said fluid outlet chamber and when pressure in said fluid outlet chamber is higher than said second preselected pressure level, and a load pressure signal line for transmitting a control signal from said load chamber to said volume output control of said variable flow pump, said control being operable to maintain a constant pressure differential between said inlet chamber and said load chamber.

35. A valve assembly as set forth in claim 34 wherein a bypass valve means interconnects said fluid inlet chamber and said fluid supply chamber and is operable to maintain said fluid supply chamber at a constant minimum preselected pressure level when said first throttling means isolates said fluid supply chamber from said fluid inlet chamber.

36. A valve assembly as set forth in claim 34 wherein anticavitation check valve means interconnect for one way fluid flow said first and second fluid load chambers with said fluid exhaust means.

* * * * *